(12) United States Patent
Nakao et al.

(10) Patent No.: US 10,365,717 B2
(45) Date of Patent: Jul. 30, 2019

(54) TACTILE SENSATION PROVIDING APPARATUS

(71) Applicant: KYOCERA Corporation, Kyoto (JP)

(72) Inventors: Fumiaki Nakao, Kawasaki (JP); Jun Takeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/321,164

(22) PCT Filed: Jun. 23, 2015

(86) PCT No.: PCT/JP2015/003137
§ 371 (c)(1),
(2) Date: Dec. 21, 2016

(87) PCT Pub. No.: WO2015/198590
PCT Pub. Date: Dec. 30, 2015

(65) Prior Publication Data
US 2017/0153704 A1    Jun. 1, 2017

(30) Foreign Application Priority Data
Jun. 26, 2014   (JP) ................. 2014-131473

(51) Int. Cl.
*G06F 3/041*   (2006.01)
*G06F 3/01*    (2006.01)

(52) U.S. Cl.
CPC ........... *G06F 3/016* (2013.01); *G06F 3/01* (2013.01); *G06F 3/041* (2013.01); *G06F 2203/04105* (2013.01)

(58) Field of Classification Search
CPC . G06F 3/01; G06F 3/016; G06F 3/041; G06F 3/0412; G06F 3/0414; G06F 2203/04105

USPC ............ 345/173; 178/18.01, 18.03
See application file for complete search history.

(56) References Cited

U.S. PATENT DOCUMENTS

| | | | |
|---|---|---|---|
| 8,633,916 B2 | 1/2014 | Bernstein et al. | |
| 8,797,295 B2 | 8/2014 | Bernstein et al. | |
| 9,122,308 B2 * | 9/2015 | Lee ................. | G06F 3/016 |
| 9,274,660 B2 | 3/2016 | Bernstein et al. | |
| 9,280,248 B2 | 3/2016 | Bernstein et al. | |
| 9,400,582 B2 | 7/2016 | Bernstein et al. | |
| 9,877,576 B2 * | 1/2018 | Satou ............... | A47B 9/10 |
| 2007/0035526 A1 | 2/2007 | Takenaka et al. | |
| 2008/0084384 A1 | 4/2008 | Gregorio et al. | |
| 2010/0141410 A1 | 6/2010 | Aono et al. | |
| 2010/0231367 A1 | 9/2010 | Cruz-Hernandez et al. | |
| 2010/0231508 A1 | 9/2010 | Cruz-Hernandez et al. | |
| 2010/0231539 A1 | 9/2010 | Cruz-Hernandez et al. | |

(Continued)

FOREIGN PATENT DOCUMENTS

| | | | |
|---|---|---|---|
| JP | 2004047852 A | * | 2/2004 |
| JP | 2011-146006 A | | 7/2011 |

(Continued)

OTHER PUBLICATIONS

English Language Machine Translation of JP-2004047852A.*

(Continued)

*Primary Examiner* — Jason M Mandeville
(74) *Attorney, Agent, or Firm* — Studebaker & Brackett PC (57) ABSTRACT

Included are a panel (30), an actuator (50), and a conversion unit (60) that is engaged with the panel (30) and the actuator (50) and uses displacement of the actuator (50) to convert the displacement direction and the displacement amount of the actuator (50) into a different displacement direction and a different displacement amount so as to cause the panel (30) to slide.

5 Claims, 8 Drawing Sheets

(56) References Cited

U.S. PATENT DOCUMENTS

| | | | |
|---|---|---|---|
| 2010/0231540 A1 | 9/2010 | Cruz-Hernandez et al. | |
| 2010/0231541 A1 | 9/2010 | Cruz-Hernandez et al. | |
| 2010/0231550 A1 | 9/2010 | Cruz-Hernandez et al. | |
| 2011/0141052 A1 | 6/2011 | Bernstein et al. | |
| 2013/0069863 A1* | 3/2013 | Lee .................. | G06F 3/016 |
| | | | 345/156 |
| 2014/0009441 A1 | 1/2014 | Bernstein et al. | |
| 2014/0092064 A1 | 4/2014 | Bernstein et al. | |
| 2014/0152148 A1 | 6/2014 | Oh et al. | |
| 2015/0160773 A1 | 6/2015 | Bernstein et al. | |
| 2015/0293631 A1 | 10/2015 | Bernstein et al. | |
| 2016/0188103 A1 | 6/2016 | Bernstein et al. | |
| 2017/0315617 A1* | 11/2017 | Nakao .................. | G06F 3/041 |

FOREIGN PATENT DOCUMENTS

| | | | |
|---|---|---|---|
| JP | 2011-150467 A | 8/2011 | |
| JP | 4875050 B2 | 2/2012 | |
| JP | 2012-520519 A | 9/2012 | |
| JP | 2013-513865 A | 4/2013 | |

OTHER PUBLICATIONS

JP Office Action dated Jan. 10, 2017 from corresponding JP Appl No. 2014-131473, with concise statement of relevance, 4 pp.

International Search Report issued in PCT/JP2015/003137; dated Aug. 25, 2015.

Written Opinion issued in PCT/JP2015/003137; dated Aug. 25, 2015; with English language Concise Explanation.

Manabu Yamada, "Explanation, by using toys, of the way of managing rotation and slide at will", MONOist, Feb. 20, 2012, http://monoist.atmarkit.co.jp/mn/articles/1202/20/news005_2.html.

Office Action issued by the Japanese Patent Office dated Sep. 6, 2016 in corresponding Japanese Patent Application No. 2014-131473; with English language Concise Explanation.

The extended European search report issued by the European Patent Office dated Jan. 22, 2018, which corresponds to European Patent Application No. 15811596.4-1216 and is related to U.S. Appl. No. 15/321,164.

* cited by examiner

TACTILE SENSATION PROVIDING APPARATUS

CROSS-REFERENCE TO RELATED APPLICATION

This application claims priority to and the benefit of Japanese Patent Application No. 2014-131473 filed Jun. 26, 2014, the entire contents of which are incorporated herein by reference.

TECHNICAL FIELD

This disclosure relates to a tactile sensation providing apparatus.

BACKGROUND

JP 4875050 B2 (PTL 1), for example, discloses a technique for providing a realistic tactile sensation to a contacting object, such as a finger, on a touch panel or other such panel. The tactile sensation providing apparatus disclosed in PTL 1 uses the squeeze film effect that occurs between the panel and the contacting object by vibrating the panel in the thickness direction, thereby providing the operator with the sensation of having "pressed" something.

CITATION LIST

Patent Literature

PTL 1: JP 4875050 B2

SUMMARY

Technical Problem

In a known tactile sensation providing apparatus, however, there is room for improvement in the apparatus configuration, since the panel is vibrated in the thickness direction.

Therefore, it would be helpful to provide an improved tactile sensation providing apparatus.

Solution to Problem

To this end, a tactile sensation providing apparatus according to this disclosure includes:
a panel;
an actuator; and
a conversion unit engaged with the panel and the actuator and configured to use displacement of the actuator to convert a displacement direction and a displacement amount of the actuator into a different displacement direction and a different displacement amount so as to cause the panel to slide.

The conversion unit may include a rotary member configured to rotate by displacement of the actuator so as to cause the panel to slide.

The conversion unit may include a linear motion member that has an inclined face extending in a direction intersecting the displacement direction of the actuator and that moves linearly in the displacement direction of the actuator by displacement of the actuator, and the conversion unit may include a sliding member that slides along the inclined face by displacement of the linear motion member so as to cause the panel to slide.

The tactile sensation providing apparatus may further include a pressure unit configured to cause the panel to engage with and press against the conversion unit and to cause the conversion unit to engage with and press against the actuator.

The actuator may include a laminated piezoelectric element; and
the laminated piezoelectric element may be disposed so that the displacement direction intersects a slide direction of the panel in plan view of the panel.

Advantageous Effect

According to this disclosure, an improved tactile sensation providing apparatus can be provided.

DETAILED DESCRIPTION

The following describes embodiments with reference to the drawings.

Embodiment 1

Figure 1:
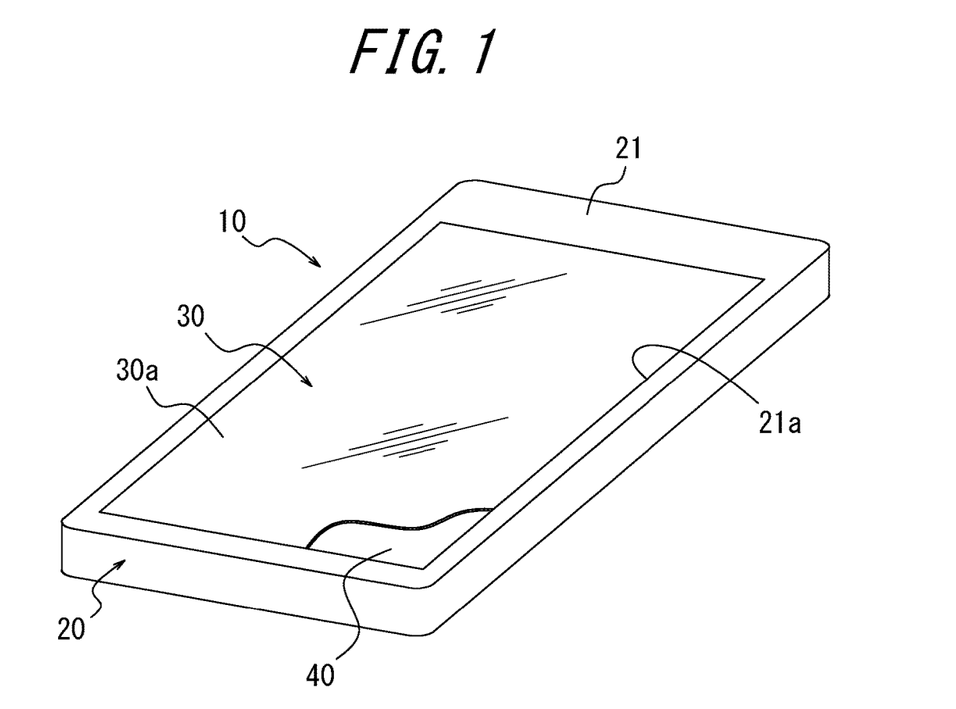
FIG. 1 is an external perspective view schematically illustrating the structure of a tactile sensation providing apparatus according to Embodiment 1 of this disclosure.

FIG. 1 is an external perspective view schematically illustrating the structure of a tactile sensation providing apparatus according to Embodiment 1 of this disclosure. This tactile sensation providing apparatus 10 may be implemented as a dedicated apparatus or may be implemented in an electronic device having other functions, such as a smartphone or other mobile phone, a portable music player, a laptop computer, a wristwatch, a tablet, a game device, or the like.

The tactile sensation providing apparatus 10 according to this embodiment includes a housing 20 having an approximately rectangular external shape. The housing 20 may be formed from metal, rigid plastic, or the like. In the housing 20, a panel 30 is provided at a front plate 21, and as illustrated by the partial cutout of the panel 30 in FIG. 1, a display 40 is held below the panel 30.

The panel 30 is a touch panel that detects contact, a cover panel that protects the display 40, or the like. The panel 30 is, for example, made from glass or a synthetic resin such as acrylic or the like. The panel 30 is, for example, formed to be rectangular. When the panel 30 is a touch panel, the panel 30 detects contact by a contacting object such as the operator's finger, a pen, a stylus pen, or the like. Any known detection system may be used in the touch panel, such as a capacitive system, a resistive film system, a surface acoustic wave system (or an ultrasonic wave system), an infrared system, an electromagnetic induction system, a load detection system, or the like. In the present embodiment, for the sake of explanation, the panel 30 is assumed to be a touch panel. In this case, the panel 30 and the display 40 may be configured integrally.

The panel 30 is supported by the housing 20 so as to be slidable in the longitudinal direction. Across the slide range, a region of the panel 30 excluding surrounding portions of the front face 30 a is exposed through an opening 21 a formed in the front plate 21 of the housing 20. When the panel 30 and the display 40 are configured integrally, both are supported so as to be able to slide integrally.

The display 40 may, for example, be configured by a liquid crystal display, an organic EL display, an inorganic EL display, electronic paper, or the like. The display 40 displays images (pages), objects for input such as icons and push buttons, and the like of application software (referred to below simply as an "application"), such as a browser, electronic book, or the like.

Figure 2:
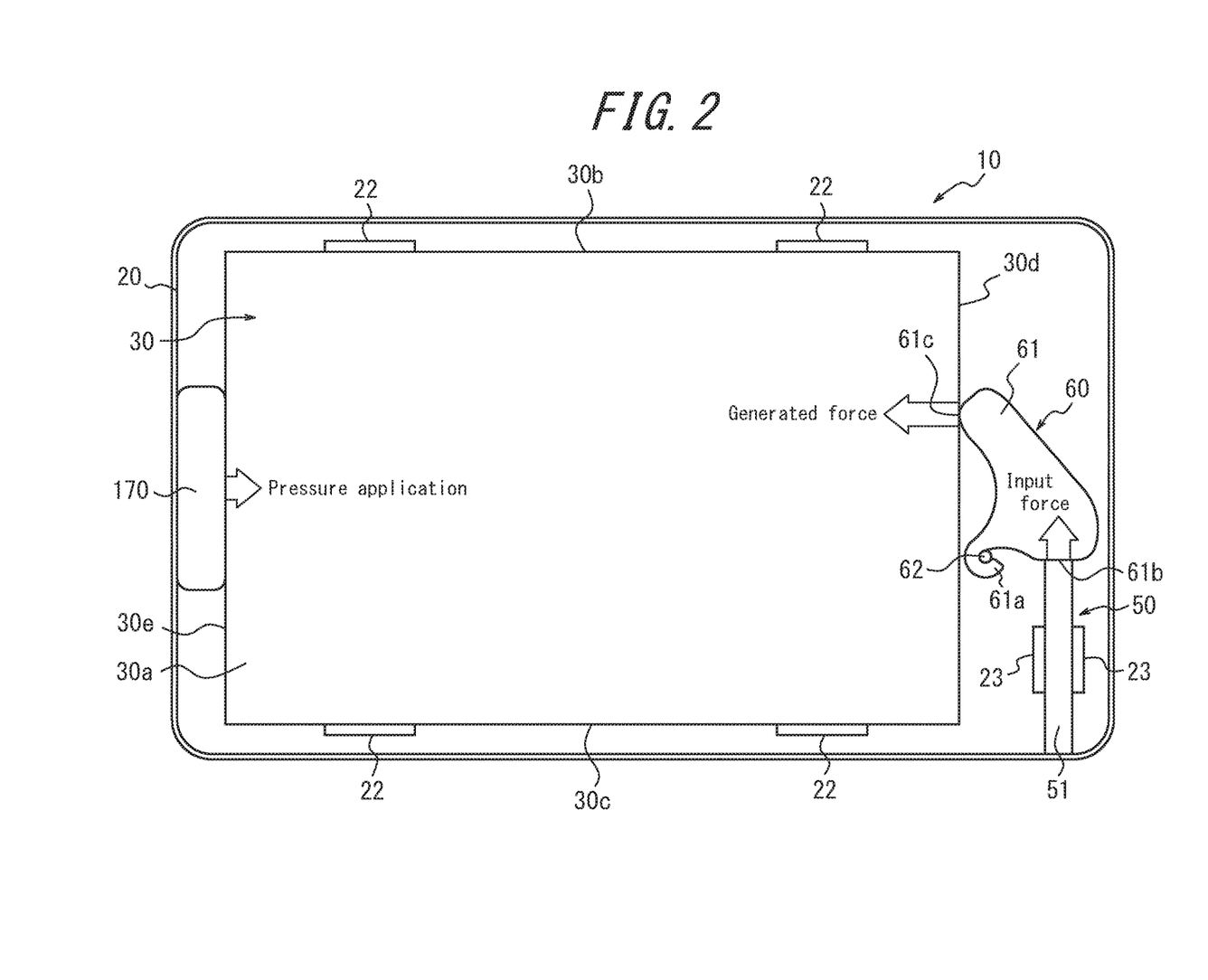
FIG. 2 is a plan view schematically illustrating an enlargement of the structure of a section of the tactile sensation providing apparatus in FIG. 1.

FIG. 2 is a plan view schematically illustrating an enlargement of the structure of a section with the front plate 21 of the housing 20 removed. Guide members 22 that position the long sides 30b and 30c of the panel 30 and guide the sliding of the panel 30 are disposed in the housing 20. In FIG. 2, an example is illustrated in which a total of four guide members 22 are disposed at the edges of the long sides 30b and 30c of the panel 30, but the number of guide members 22 is not limited to four. On each long side, three or more may be provided, or one elongated guide member may be provided.

On one short side 30d of the panel 30, an actuator 50 and a conversion unit 60 are provided in the housing 20. The actuator 50 constitutes the driving source for sliding the panel 30 and is configured by, for example, a piezoelectric element 51. The piezoelectric element 51 is formed by elements that, upon application of an electric signal (voltage), are displaced either by expansion and contraction or by bending in accordance with the electromechanical coupling coefficient of their constituent material. Ceramic or crystal elements, for example, may be used. The piezoelectric element 51 may be a unimorph, bimorph, or laminated piezoelectric element. Examples of a laminated piezoelectric element include a laminated bimorph element with layers of bimorph and a stack-type element configured with a laminated structure formed by a plurality of dielectric layers composed of, for example, lead zirconate titanate (PZT) and electrode layers disposed between the dielectric layers. Unimorph is displaced by expansion and contraction upon the application of an electric signal, bimorph is displaced by bending upon the application of an electric signal, and a stack-type laminated piezoelectric element is displaced by expansion and contraction along the lamination direction upon the application of an electric signal. In the present embodiment, the piezoelectric element 51 is a stack-type laminated piezoelectric element.

One end of the piezoelectric element 51 is fixed to an inner wall of the housing 20, and the piezoelectric element 51 extends nearly in parallel with the short side 30d of the panel 30. Accordingly, the displacement direction of the piezoelectric element 51 and the slide direction of the panel 30 intersect in plan view of the panel 30. In order to guide displacement of the piezoelectric element 51, a pair of guide members 23 is disposed in the housing 20 so as to sandwich the piezoelectric element 51.

The conversion unit 60 is disposed to engage with the short side 30d of the panel 30 and with the end face of the other end of the piezoelectric element 51. The conversion unit 60 uses displacement of the piezoelectric element 51 to convert the displacement direction and displacement amount thereof into a different displacement direction and a different displacement amount so as to cause the panel 30 to slide. In this embodiment, the conversion unit 60 includes a rotary member 61. The rotary member 61 includes a latch 61 a that rotatably latches onto a fixed axle 62, an abutment 61b abutted by the piezoelectric element 51, and an abutment 61c abutted by the short side 30d of the panel 30. The latch 61 a is shaped as a hook, and the abutments 61b and 61c are formed as projections.

A pressure unit 170 is disposed on the other short side 30e of the panel 30. In FIG. 2, the pressure unit 170 pushes the panel 30 to the right, causing the short side 30d of the panel 30 to abut and press against the abutment 61c of the rotary member 61 and causing the abutment 61b of the rotary member 61 to abut and press against the piezoelectric element 51. The pressure unit 170 may, for example, be configured by an elastic body such as buffer material, a spring, rubber, or the like.

In FIG. 2, when the piezoelectric element 51 is displaced upwards, the rotary member 61 rotates to the left, with a fixed axle 62 as a pivot point. As a result, the displacement direction of the piezoelectric element 51 is converted nearly 90° by the conversion unit 60 and is transmitted to the panel 30, and the panel 30 slides to the left against the pressure applied by the pressure unit 170.

Figure 3:
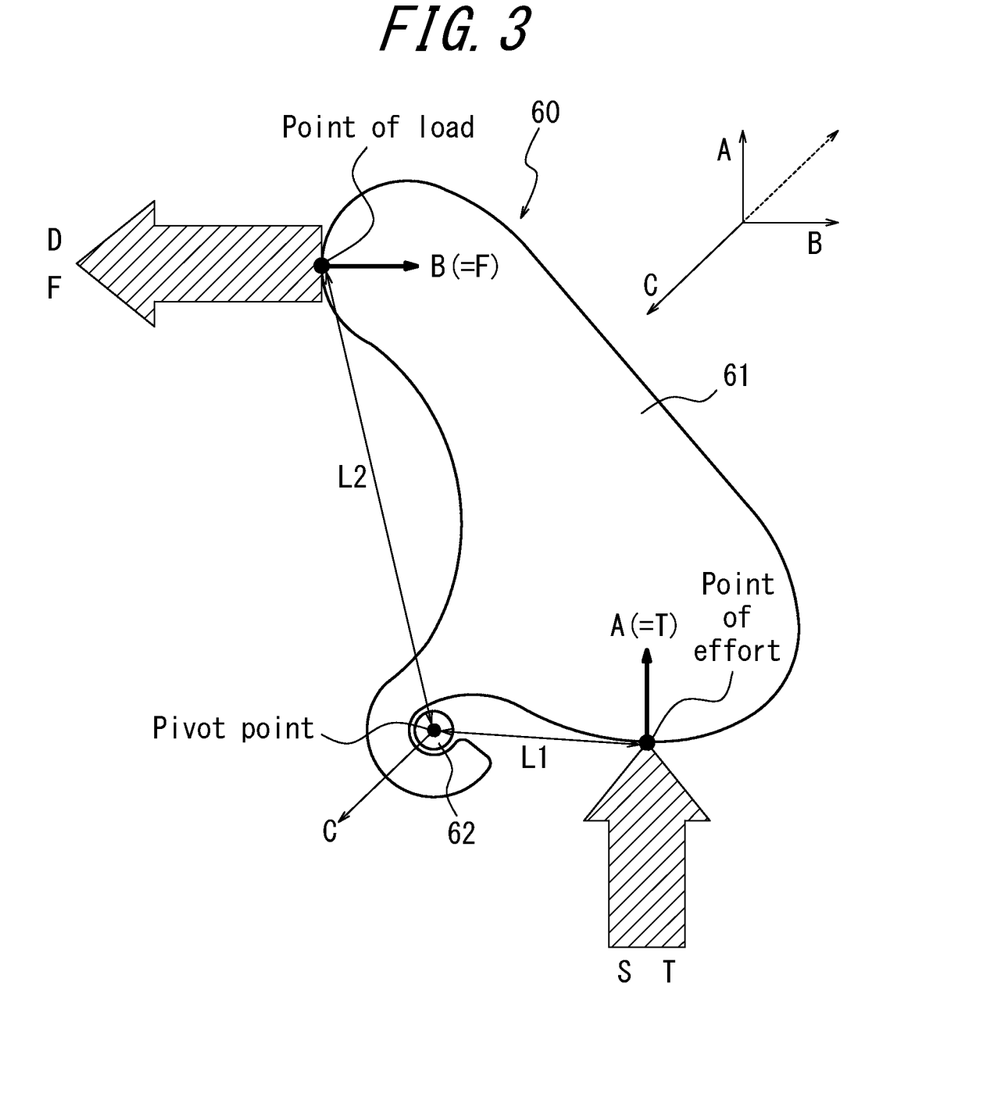
FIG. 3 illustrates operation of the conversion unit in FIG. 2.

With reference to FIG. 3, operation of the conversion unit 60 is now described. FIG. 3 is an enlargement of the conversion unit 60. In FIG. 3, the pivot point indicates the fixed axle 62 with which the latch 61 a of the rotary member 61 engages, the point of effort indicates the abutment 61b of the rotary member 61 abutted by the piezoelectric element 51, and the point of load indicates the abutment 61c abutted by the short side 30d of the panel 30. When S is the input displacement amount and T is the input force input to the point of effort by displacement of the piezoelectric element 51, D is the displacement amount and F is the generated force acting on the point of load, L1 is the distance from the fixed axle 62 that is the pivot point to the point of effort, and L2 is the distance from the pivot point to the point of load, then the displacement amount D and generated force F can be approximated as in Equations (1) and (2) below. Here, L1 and L2 are respectively sufficiently larger than S and D.

$$D = S \times L2/L1 \tag{1}$$

$$F = T \times L1/L2 \tag{2}$$

From Equations (1) and (2) above, by appropriately setting the positions of the point of effort and the point of load, i.e. the distances L1 and L2, a displacement amount D and generated force F sufficient to provide a tactile sensation can be obtained. In general, with the laminated piezoelectric element 51, the input force T is large, but the input displacement amount S is small. By contrast, the slide amount of the panel 30 that can provide a tactile sensation, i.e. the displacement amount D, is large as compared to the input displacement amount S, and the force causing the panel 30 to slide, i.e. the generated force F, is small as compared to the input force T. Accordingly, the laminated piezoelectric element 51 that is readily available can be used.

The angle formed between the displacement direction of the piezoelectric element 51 and the slide direction of the panel 30, i.e. the conversion angle for the displacement direction of the piezoelectric element 51, is not limited to being 90° and may be set to any value. A simple configuration may therefore be used.

As illustrated in FIG. 3, drag A (equal to T) due to the piezoelectric element 51 that is the force generator, drag B (equal to F) due to the panel 30 that is the target of displacement, and drag C (equal to $(T^2+F^2)^{1/2}$) to balance out the drag A and drag B are produced in the rotary member 61. In other words, upon determining the position of the fixed axle 62 so that the drag A and drag B are always produced, the position of the rotary member 61 is determined by the balance of the three effects A, B, and C. Accordingly, the rotary member 61 need not be held tightly against the fixed axle 62, thereby increasing the degree of freedom for the shape of the rotary member 61 and making the conversion unit 60 easier to assemble. For example, instead of the shape in FIG. 3, the rotary member 61 may have the shapes illustrated in FIGS. 4A to 4C.

Figure 4A:
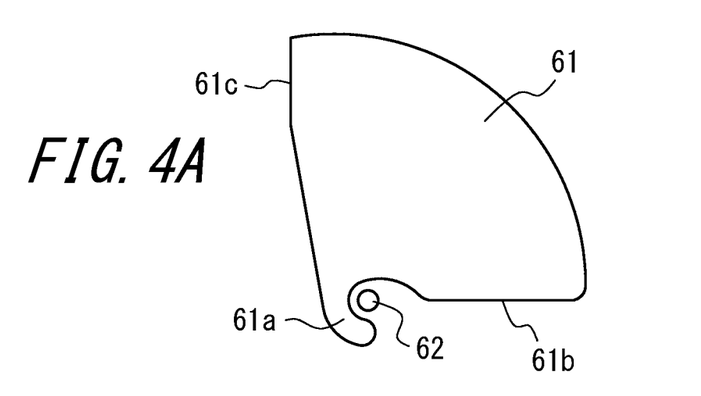
FIG. 4A illustrates a modification to the conversion unit in FIG. 2.
Figure 4B:
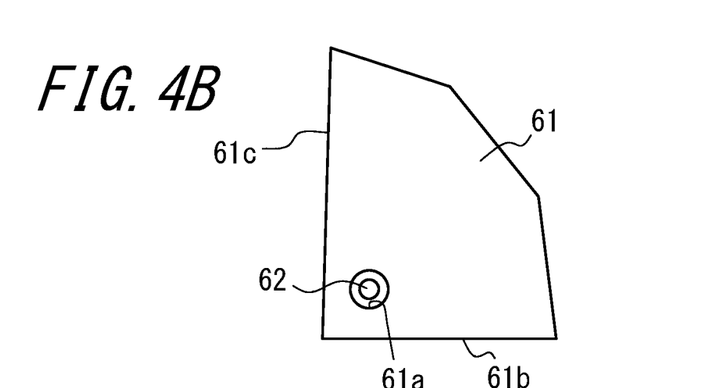
FIG. 4B illustrates a modification to the conversion unit in FIG. 2.
Figure 4C:
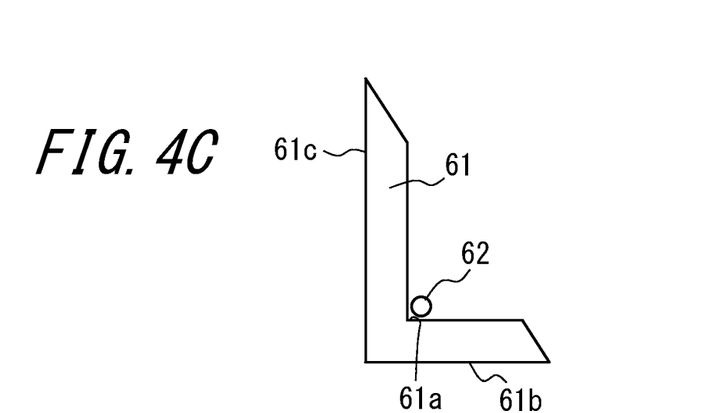
FIG. 4C illustrates a modification to the conversion unit in FIG. 2.

In the rotary member 61 illustrated in FIG. 4A, the latch 61a is formed in the shape of a hook, and the abutments 61b and 61c are formed on the sides of a fan shape. The rotary member 61 illustrated in FIG. 4B overall has a polygonal fan shape. At the peak of the fan shape, the latch 61a is formed to have an opening with a greater diameter than the fixed axle 62, and the abutments 61b and 61c are formed on the sides of the fan shape. The rotary member 61 illustrated in FIG. 4C overall has an L shape. The inner angle of the L shape forms the latch 61a, and the abutments 61b and 61c are formed on the outer sides.

By the drag A and drag B always acting on the rotary member 61, the ratio L1:L2, i.e. the ratios D:S and T:F can be maintained nearly constant, even if friction occurs in the engaging section between the rotary member 61 and the fixed axle 62. Accordingly, without being affected by wear, the panel 30 can be caused to slide stably over an extended period of time under initial conditions.

The tactile sensation providing apparatus 10 according to this embodiment detects contact or a press on the panel 30 by the contacting object, such as the operator's finger, pen, or stylus pen, and displaces the piezoelectric element 51. As a result, the panel 30 is caused to slide, providing a tactile sensation as feedback to the operator.

Figure 5:
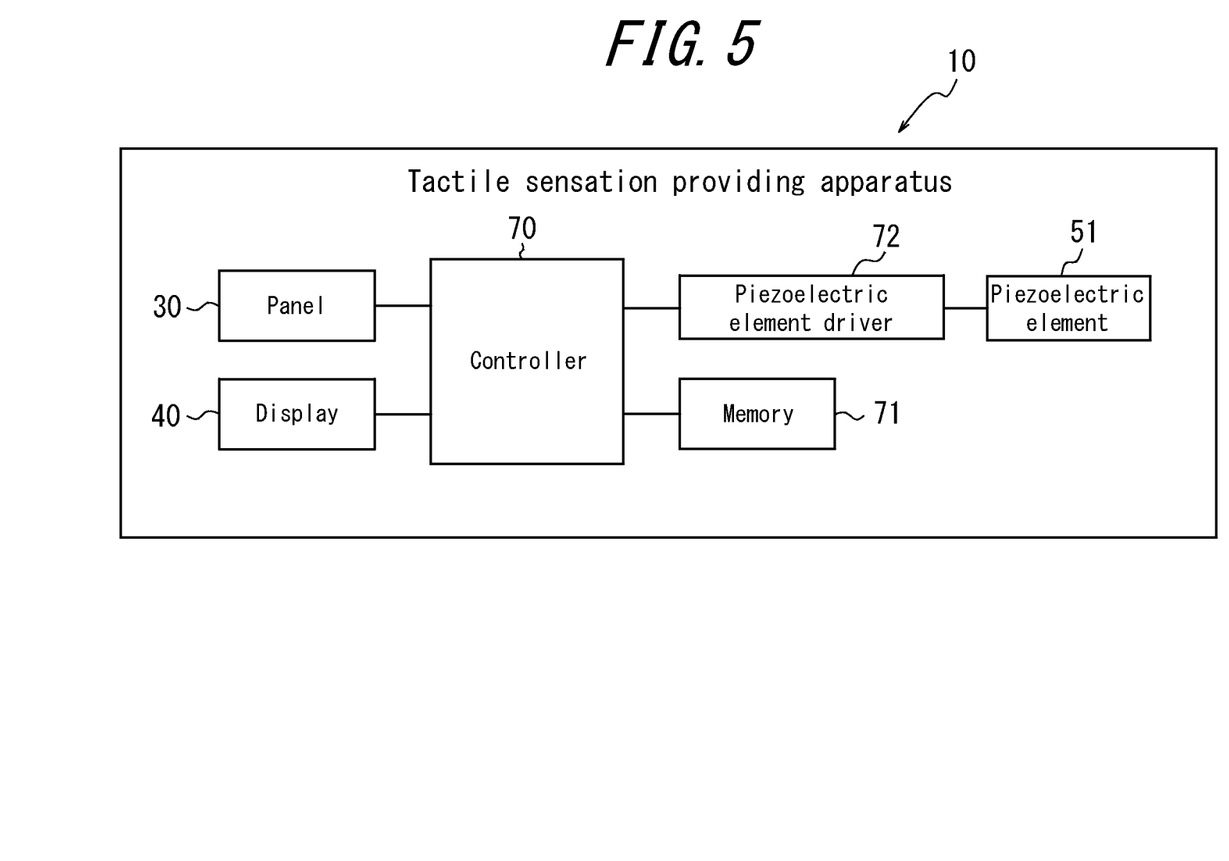
FIG. 5 is a functional block diagram illustrating the circuit structure of a section of the tactile sensation providing apparatus in FIG. 1.

FIG. 5 is a functional block diagram illustrating the circuit structure of a section of the tactile sensation providing apparatus 10 in FIG. 1. The tactile sensation providing apparatus 10 includes a controller 70, a memory 71, a piezoelectric element driver 72, and the above-described panel 30, display 40, and piezoelectric element 51.

The controller 70 is a processor that, starting with the functional blocks of the tactile sensation providing apparatus 10, controls and manages the measurement apparatus 10 overall. The controller 70 is configured by a processor such as a Central Processing Unit (CPU) that executes a program specifying control procedures. Such a program may, for example, be stored in the memory 71, on an external storage medium, or the like.

The memory 71 is configured by a semiconductor memory or the like. The memory 71 stores a variety of information, programs for causing the tactile sensation providing apparatus 10 to operate, and the like and also functions as a working memory.

The piezoelectric element driver 72 generates an electric signal to apply to the piezoelectric element 51 based on a control signal from the controller 70 and applies the electric signal to the piezoelectric element 51.

Under the control of the controller 70, the display 40 displays images (pages), objects for input such as icons and push buttons, and the like of an application. The panel 30 detects contact by the contacting object to an object displayed on the display 40. The output of the panel 30 is provided to the controller 70, and the position of contact by the contacting object on the panel 30 is detected.

Upon detecting contact, based on the output of the panel 30, by the contacting object on an object for input displayed on the display 40, the controller 70 uses the piezoelectric element driver 72 to drive the piezoelectric element 51 with a predetermined driving pattern. The controller 70 may detect contact on the panel 30, further detect that the pressing load on the panel 30 by the contacting object has reached a predetermined value, and then drive the piezoelectric element 51. In this case, the pressing load on the panel 30 may, for example, be detected based on output of the panel 30 or may be detected by attaching a load sensor such as a piezoelectric element, strain sensor, or the like to the panel 30. The panel 30 is caused to slide by driving of the piezoelectric element 51, and the operator is provided with a tactile sensation of having operated the object for input.

The driving pattern of the piezoelectric element 51 may, for example, be stored in the memory 71 in accordance with the object for input for which contact by the contacting object is detected. For example, when providing a tactile sensation of having pushed a push button, a pulsed driving voltage of half of a cycle at a predetermined frequency may be applied to the piezoelectric element 51 for a driving pattern that slides the panel 30 once back and forth. Additionally, in accordance with the object for input, a driving voltage of multiple cycles at a predetermined frequency may be applied to the piezoelectric element 51 for a driving pattern that slides the panel 30 back and forth multiple times.

With the tactile sensation providing apparatus 10 according to this embodiment, a tactile sensation is provided by sliding the panel 30. Hence, as compared to when the panel 30 is displaced in the thickness direction, for example restrictions on the dimensions of the apparatus in the thickness direction can be eased. Since the conversion unit 60 includes the rotary member 61, as described with reference to FIG. 3, the laminated piezoelectric element 51 that is readily available can be used for a simple configuration. Since the rotary member 61 need not be held tightly against the fixed axle 62, the degree of freedom for the shape of the rotary member 61 is increased, making the conversion unit 60 easier to assemble. Also, without being affected by wear of the engaging section between the rotary member 61 and the fixed axle 62, the panel 30 can be caused to slide stably over an extended period of time under initial conditions.

By the pressure unit 170, the panel 30 is abutted against the abutment 61c of the rotary member 61, and the abutment 61b of the rotary member 61 is abutted against the piezoelectric element 51, thereby allowing the panel 30 to slide smoothly due to the piezoelectric element 51. The piezoelectric element 51 is disposed along the short sides of the panel 30, i.e. so that the displacement direction of the piezoelectric element 51 and the slide direction of the panel 30 intersect in plan view of the panel 30. Hence, the dimensions of the apparatus in the direction of the long sides of the panel 30 can be reduced, making the apparatus more compact.

Embodiment 2

Figure 6:
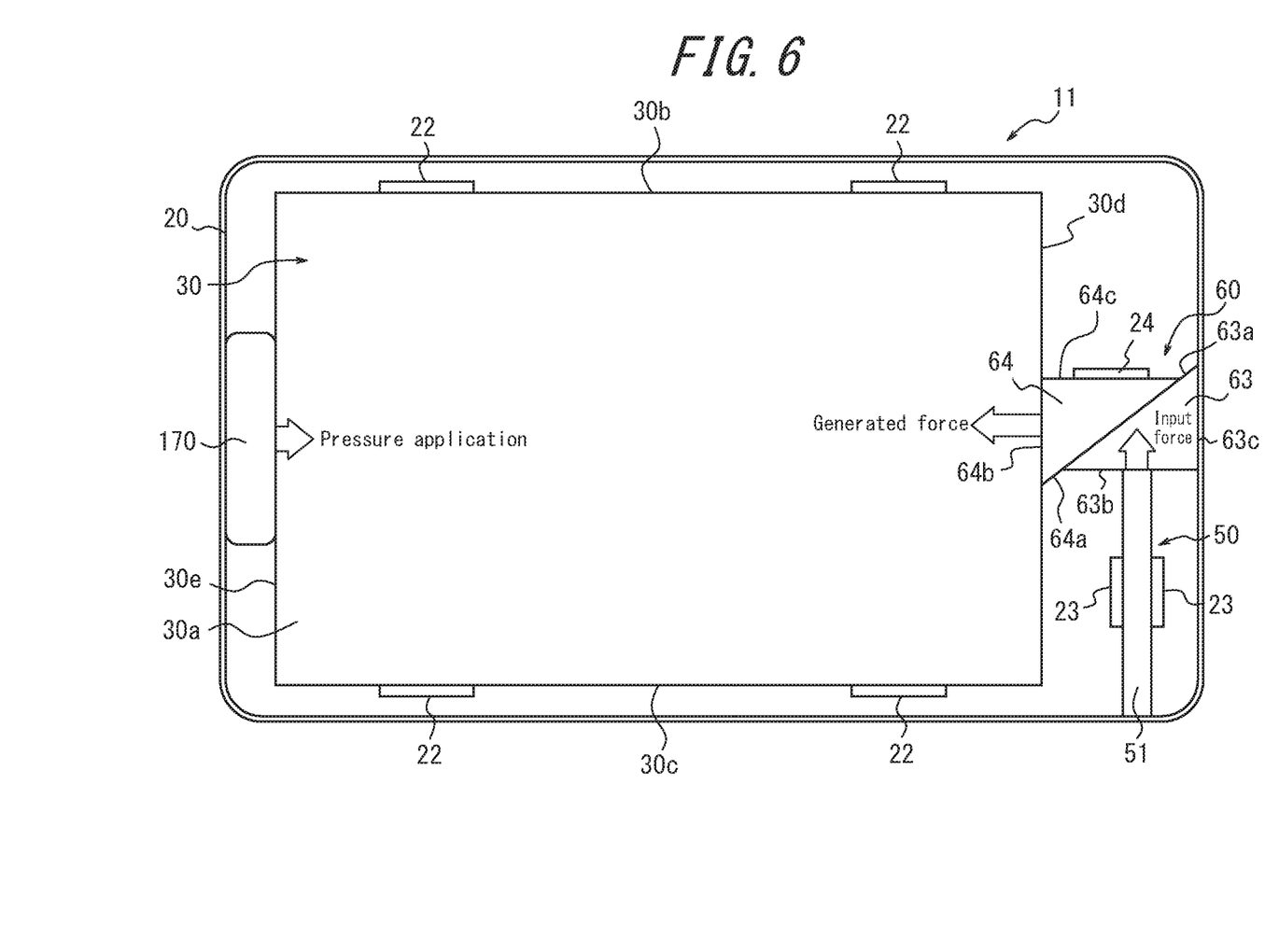
FIG. 6 is a plan view schematically illustrating the structure of a section of a tactile sensation providing apparatus according to Embodiment 2 of this disclosure.

FIG. 6 is a plan view schematically illustrating the structure of a section of a tactile sensation providing apparatus according to Embodiment 2 of this disclosure. FIG. 6 corresponds to FIG. 2. The tactile sensation providing apparatus 11 according to this embodiment differs from the tactile sensation providing apparatus 10 according to Embodiment 1 in the structure of the conversion unit 60. Constituent elements that are the same as in Embodiment 1 are labeled with the same reference signs, and the portions that differ are described below.

In FIG. 6, the conversion unit 60 includes a linear motion member 63 and a sliding member 64. The linear motion member 63 has a wedge shape that includes an inclined face 63a extending in a direction that intersects the displacement direction of the piezoelectric element 51, a side 63b connected to the piezoelectric element 51, and a side 63c that slides along an inner wall of the housing 20. The sliding member 64 has a triangular shape that includes a sliding face 64a that slides along the inclined face 63a of the linear motion member 63, a side 64b connected to the short side 30d of the panel 30, and a side 64c that extends in the direction of the long sides of the panel 30 and slides along a guide member 24 provided in the housing 20.

In FIG. 6, upon the piezoelectric element 51 being displaced upwards, the linear motion member 63 is guided by the housing 20 and is also displaced upwards integrally with the piezoelectric element 51. Upon the linear motion member 63 being displaced upwards, the sliding member 64 slides along the inclined face 63a of the linear motion member 63 as a result of the displacement and is displaced linearly to the left in FIG. 6 along the guide member 24. As a result, the displacement direction of the piezoelectric element 51 is converted nearly 90° by the conversion unit 60 and is transmitted to the panel 30, and the panel 30 slides to the left against the pressure applied by the pressure unit 170.

Figure 7A:
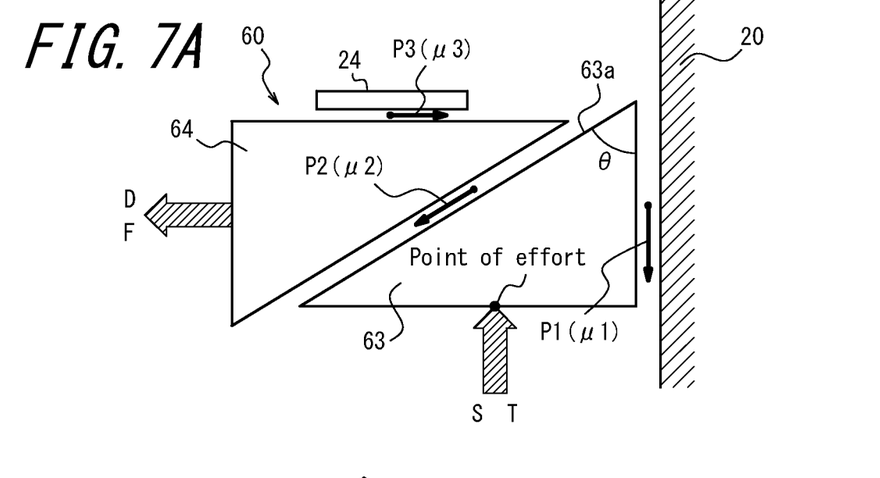
FIG. 7A illustrates operation of the conversion unit in FIG. 6.
Figure 7B:
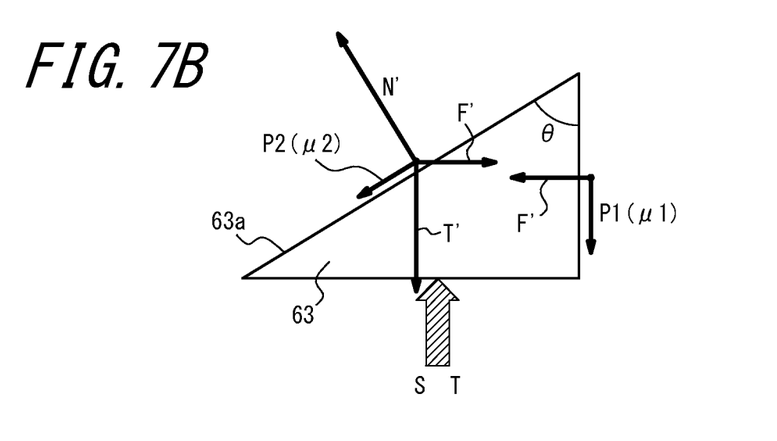
FIG. 7B illustrates operation of the conversion unit in FIG. 6.
Figure 7C:
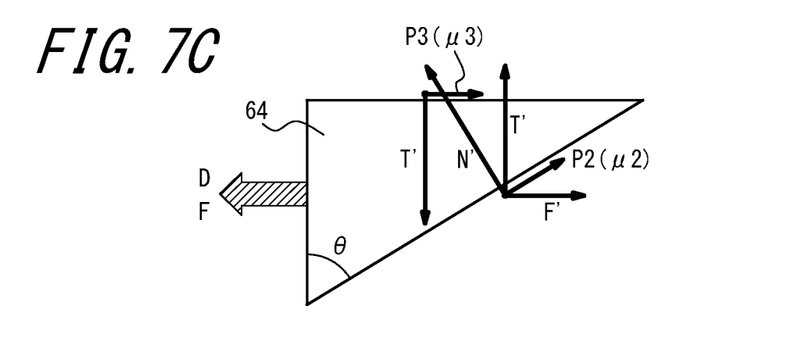
FIG. 7C illustrates operation of the conversion unit in FIG. 6.

With reference to FIGS. 7A to 7C, operation of the conversion unit 60 is now described. FIG. 7A is an enlargement of the conversion unit 60, FIG. 7B is an enlargement of the linear motion member 63, and FIG. 7C is an enlargement of the sliding member 64. In FIG. 7A, S is the input displacement amount and T is the input force input to the point of effort of the linear motion member 63 by displacement of the piezoelectric element 51, D is the displacement amount and F is the generated force received by the sliding member 64 (panel 30) from the point of load of the linear motion member 63, and θ is the angle of the inclined face 63a relative to the displacement direction of the linear motion member 63. In this case, the displacement amount D is represented by Equation (3) below.

$$D = S \times \tan\theta \qquad (3)$$

The frictional force is P1 and the coefficient of friction is μ1 between the linear motion member 63 and the housing 20 that acts as a guide, the frictional force is P2 and the coefficient of friction is μ2 between the linear motion member 63 and the sliding member 64, the frictional force is P3 and the coefficient of friction is μ3 between the sliding member 64 and the guide member 24, and the input force and generated force taking friction into account are respectively T' and F'. In this case, the frictional forces P1 and P2 act on the linear motion member 63, as illustrated in FIG. 7B. These frictional forces P1 and P2 are represented by the following equations, where N' is the resultant force of the input force T' and the generated force F' acting in the normal direction of the inclined face 63a.

$$P1 = \mu1 \times F'$$

$$P2 = \mu2 \times N' \mu2 \times T'/\sin\theta$$

Accordingly, the input force T in this case is as in Equation (4) below.

$$\begin{aligned}
T &= T' + P1 + P2 \times \cos\theta \qquad (4)\\
&= T' + \mu1 + F' + \mu2 \times T'/\sin\theta \times \cos\theta\\
&= T' + \mu1 \times T' \times \cot\theta + \mu2 \times T' \cot\theta\\
&= T' \times (1 + \mu1\cot\theta + \mu2\cot\theta)
\end{aligned}$$

The frictional forces P2 and P3 act on the sliding member 64, as illustrated in FIG. 7C. These frictional forces P2 and P3 are represented by the following equations.

$$P2 = \mu2 \times N' \mu2 \times T'/\sin\theta$$

$$P3 = \mu3 \times T'$$

Accordingly, the generated force F in this case is as in Equation (5) below.

$$\begin{aligned}
F &= F' - P3 - P2 \times \sin\theta \qquad (5)\\
&= T'/\tan\theta - \mu3 \times T' - \mu2 \times T'\\
&= T' \times (\cot\theta - \mu2 - \mu3)
\end{aligned}$$

From Equations (4) and (5) above, the generated force F acting on the panel 30 due to the input force T by the piezoelectric element 51 is represented as Equation (6) below.

$$F = T \times (\cot\theta - \mu2 - \mu3)/(1 + \mu1\cot\theta + \mu2\cot\theta) \qquad (6)$$

When there is no friction, $F = T \times \cot\theta$. Furthermore, letting all of the coefficients of friction be the same (μ) yields $F = T \times (\cot\theta - 2\mu)/(1 + 2\mu\cot\theta)$.

According to this embodiment, from Equations (3) and (6) above, by appropriately setting the angle θ of the inclined face 63a relative to the displacement direction of the linear motion member 63, a displacement amount D and generated force F sufficient to provide a tactile sensation can be obtained. Accordingly, as in Embodiment 1, the laminated piezoelectric element 51 that is readily available can be used. Furthermore, the linear motion member 63 and the sliding member 64 are both displaced linearly, yielding a simpler configuration. The other effects are similar to those of Embodiment 1. The conversion angle for the displacement direction by the linear motion member 63 and the sliding member 64 is not limited to being 90° and may be set to any angle.

The present disclosure is not limited to the above embodiments, and a variety of modifications and changes are possible. For example, the actuator is not limited to a piezoelectric element and may be configured using a magnetostrictor, a shape-memory alloy, or the like. In Embodiment 2, the conversion unit 60 may be configured as illustrated in FIG. 8 or FIG. 9.

Figure 8:
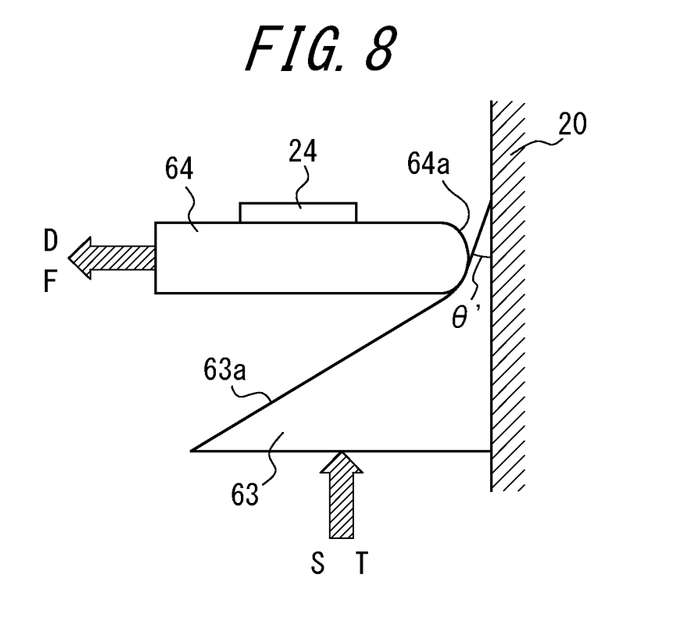
FIG. 8 illustrates a modification to the conversion unit in FIG. 6.

In the conversion unit 60 illustrated in FIG. 8, the inclined face 63a of the linear motion member 63 is formed as a curved surface, and the sliding face 64a of the sliding member 64 is formed as a curved surface in accordance with the shape of the inclined face 63a. By forming the inclined face 63a of the linear motion member 63 as a curved surface in this way, the angle of a tangent to the point of load in contact with the sliding member 64 changes as a result of displacement of the linear motion member 63. Therefore, the change in the displacement amount D and the generated force F can be made non-linear with respect to the input displacement.

Accordingly, for example by making the angle θ' of the upper portion of the linear motion member 63 in FIG. 8 smaller than the angle θ in FIG. 7A, then upon initial input of the input force T, the displacement of the sliding member 64 is small, but the load due to static friction of the friction force P2 can be reduced, and from the start of kinetic friction onwards, displacement of the sliding member 64 can be increased. As a result, the panel 30 can be caused to slide more smoothly.

Figure 9:
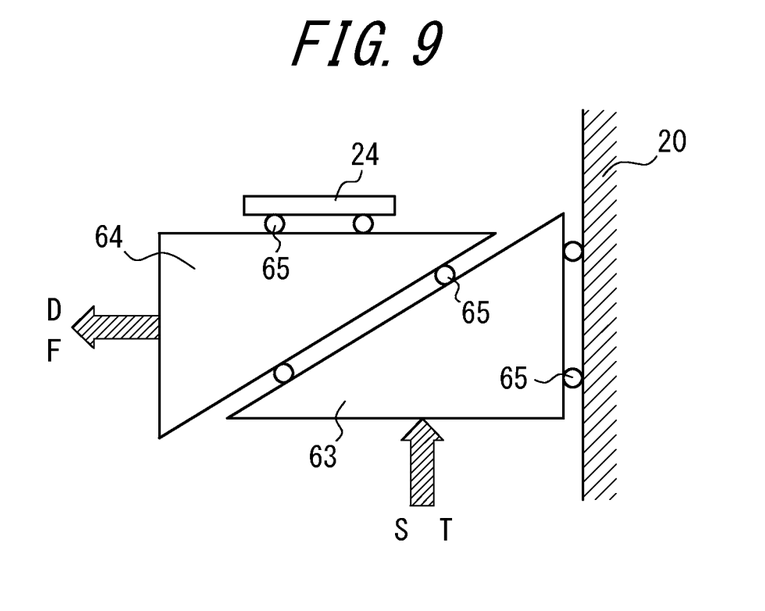
FIG. 9 illustrates another modification to the conversion unit in FIG. 6.

The conversion unit 60 illustrated in FIG. 9 includes a plurality of bearings 65 between the linear motion member 63 and the housing 20 that acts as a guide, between the linear motion member 63 and the sliding member 64, and between the sliding member 64 and the guide member 24. The bearings 65 may be spherical or may be cylindrical. In this way, by loading bearings 65 into the portions where the frictional forces P1, P2, and P3 are generated in Embodiment 2, the frictional forces can be reduced nearly to zero, allowing the panel 30 to be caused to slide more smoothly with a smaller input force T.

REFERENCE SIGNS LIST 10, 11 Tactile sensation providing apparatus
20 Housing
30 Panel
50 Actuator
51 (Laminated) piezoelectric element
60 Conversion unit
61 Rotary member
62 Fixed axle
63 Linear motion member
63a Inclined face
64 Sliding member
65 Bearing
70 Pressure unit

The invention claimed is:

1. A tactile sensation providing apparatus comprising:
a panel;
an actuator; and
a conversion unit engaged with the panel and the actuator and formed to use displacement of the actuator to convert a displacement direction of the actuator and a displacement amount of the actuator into a different displacement direction, which intersects with the displacement direction of the actuator, at a point of load where the conversion unit engages with the panel and a different displacement amount, which is greater than a displacement amount of the actuator, at the point of load where the conversion unit engages with the panel so as to cause the panel to slide in a plane of the panel.

2. The tactile sensation providing apparatus of claim 1, wherein the conversion unit includes a rotary member configured to rotate by the displacement of the actuator so as to cause the panel to slide.

3. The tactile sensation providing apparatus of claim 1, wherein the conversion unit includes a linear motion member that has an inclined face extending in a direction intersecting the displacement direction of the actuator and that moves linearly in the displacement direction of the actuator by the displacement of the actuator, and the conversion unit includes a sliding member that slides along the inclined face by displacement of the linear motion member so as to cause the panel to slide.

4. The tactile sensation providing apparatus of claim 1, further comprising a pressure unit configured to cause the panel to engage with and press against the conversion unit and to cause the conversion unit to engage with and press against the actuator.

5. The tactile sensation providing apparatus of claim 1, wherein
the actuator includes a laminated piezoelectric element; and
the laminated piezoelectric element is disposed so that the displacement direction of the actuator intersects a slide direction of the panel in plan view of the panel.

* * * * *